United States Patent [19]

Horstman

[11] Patent Number: 5,033,696

[45] Date of Patent: Jul. 23, 1991

[54] FLUSH MOUNTED HATCH OPENER

[75] Inventor: Robert L. Horstman, Malibu, Calif.

[73] Assignee: Rockwell International Corporation, El Segundo, Calif.

[21] Appl. No.: 450,965

[22] Filed: Dec. 15, 1989

[51] Int. Cl.[5] .................... B64C 1/14

[52] U.S. Cl. .................... 244/129.400; 292/7

[58] Field of Search .................... 244/129.4–129.5; 292/7, 36, 29, 40

[56] References Cited

U.S. PATENT DOCUMENTS

| | | | |
|---|---|---|---|
| 2,465,727 | 3/1949 | Jensen | 292/7 |
| 2,772,809 | 12/1956 | Ross | 292/7 |
| 4,213,642 | 7/1980 | Poe et al. | 292/241 |
| 4,467,936 | 8/1984 | Makhijani | 292/7 |

FOREIGN PATENT DOCUMENTS

| | | | |
|---|---|---|---|
| 0755697 | 5/1943 | Fed. Rep. of Germany | 292/7 |

*Primary Examiner*—Joseph F. Peters, Jr.
*Assistant Examiner*—Linda L. Palomar
*Attorney, Agent, or Firm*—Charles T. Silberberg; Harold C. Weston; Terrell P. Lewis

[57] ABSTRACT

A hatch opener mechanism mounted flush with a skin panel having a rotatable disk with subjacent spindles and actuator rods, activated by rotating the disk with tool insertable into a socket with a spring biased cover at the center of the disk.

24 Claims, 2 Drawing Sheets

FLUSH MOUNTED HATCH OPENER

BACKGROUND OF THE INVENTION

1. Field of the Invention

This invention relates to latch activator mechanisms and more particularly to a mechanism useable for control of latches of access hatches on high performance aircraft where minimal intrusion of hatch control hardware into the aircraft mold line is a design criterion. Presented here is a mechanism with no intrusion into the aircraft's slip stream, flush mounted to skin panels or to the access hatch itself, providing reliable operation, with peripheral advantages associated with its flush mounting. The mechanism comprises a circular plate, rotatable about a central axis by means of a socket at its center and with latch activator rods on spindles of its underside to control latch unlocking by movement of latch pins. A spring biased cover fits snugly over the socket so that a keyed tool can readily depress the same and allow the depressing tool to apply torque to the plate and move the actuator rods.

DESCRIPTION OF THE PRIOR ART

Access means for aircraft utilities such as door openers, panel attach clamps, gas caps and accessory ports are well known in aircraft technology. Some of these are documented in patents such as U.S. Pat. No. 2,772,809 to O.E. Ross for a tank filler cap; or U.S. Pat. No. 1,866,299 to G.R. Ericson for a flush mounted door latch; and U.S. Pat. No. 4,213,642 to L.R. Poe for a rotary latch mechanism to provide positive indication of latch position for a rotary actuator system. None of the references found suggests the spindle mounted actuator rod system of this invention and its associated close tolerance actuating and access port clearances. The actuator tool of this invention allows reasonable forces to be applied to latch actuator rod mountings on a circular plate. As the plate rotates, the actuator rods withdraw pins in associated latch mechanisms, allowing a hatch secured by such a latch, to open for needed access.

SUMMARY OF THE INVENTION

The within invention comprises an arrangement of actuator rods coupled between latch pins on access hatches and spindles on the underside of a rotatable disk, fixed to a location on, or adjacent, an access hatch. When the disk is caused to rotate through torque applied at tool faces integral therewith, positioned around its central axis, spindles on the underside of the disk operate actuator rods coupled to latch pins and release the locking latches for hatch opening. Torque is applied by a tool inserted into a covered socket at the center of the disk. Pressure on this spring biased cover depresses it, allowing the tool to interface with tool faces of the socket which socket is integral with the disk.

Adjustment of a spring under the cover, maintains the cover flush with surrounding skin panels during normal operations. Careful machining of the disk and its associated bearing and skin cutout, with close matching of its socket cover with fuselage or structure panels, results in low reflectivity of impingent electromagnetic radiation as well as friction free flow of the air stream over it. Accordingly, it is an object of this invention to provide a mechanism for operating latches of access doors on high performance aircraft with no disturbance of the aircraft's mold line by the mechanism.

DESCRIPTION OF THE PREFERRED EMBODIMENT

Figure 1:
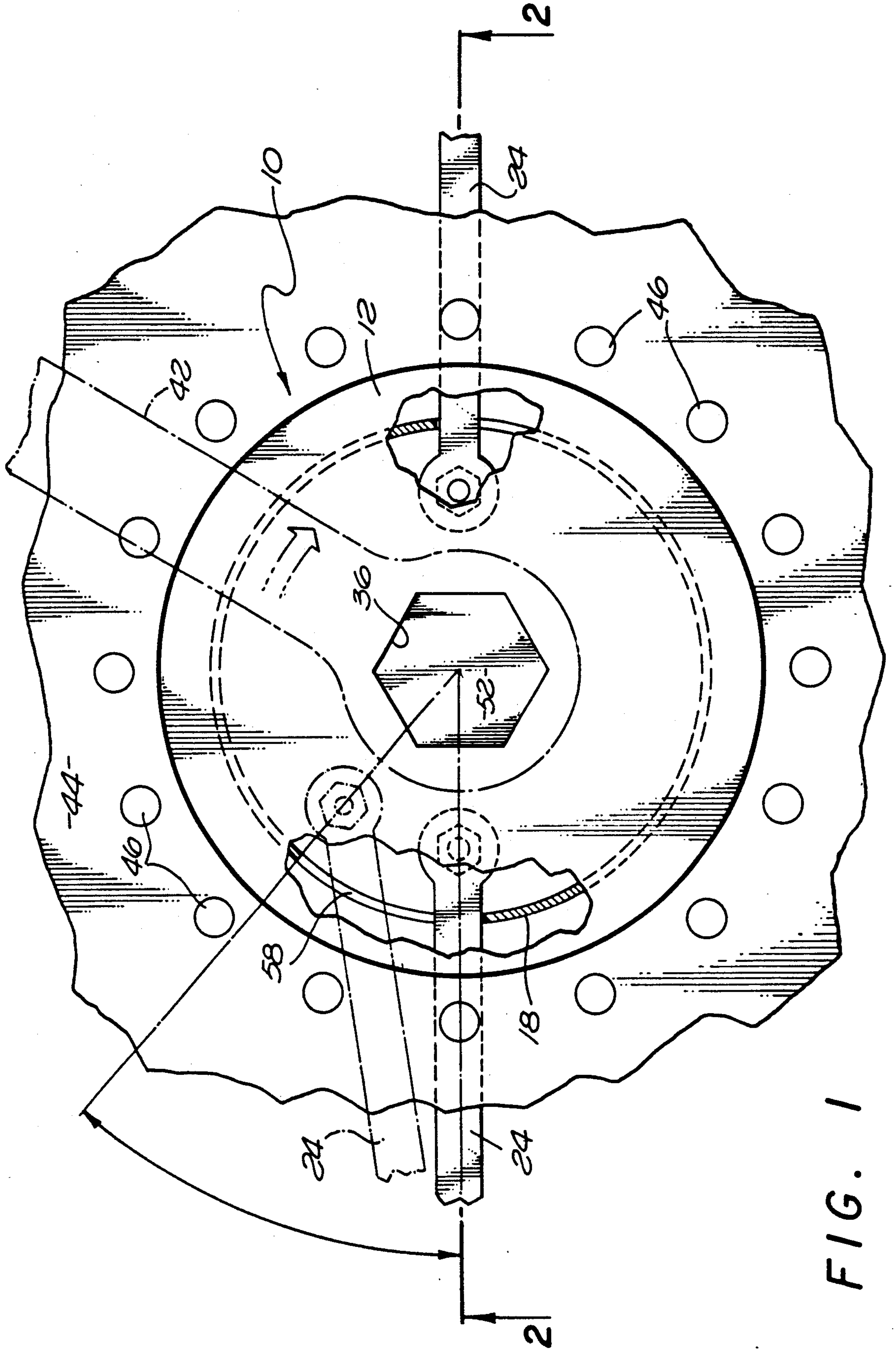
FIG. 1 is a top plan view, partially phantom, of the invention as mounted to structure.

A hatch opener mechanism 10 designed for zero intrusion of air space immediately surrounding it, utilizes rotary motion of a circular planar disk 12 with spindles 22 fixed on an underside thereof to drive actuator rods 24 to unlatch securement, or "latching", pins of an access hatch. Disk 12 has a socket 36 at its center extending downwardly from its surface. Rotation of disk 12 is effected by applying leverage to the handle 42 of tool 40 after insertion of tool 40 into this socket 36. Tool 40 is inserted into socket 36 by placing it directly above cover 52 and pressing downward, compressing spring 32 and bringing working surfaces 48 of tool 40 into engagement with tool faces 38 of socket 36. While holding spring 32 compressed, torque is applied to handle 42. Force from tool 40 is transferred to tool faces 38 which are integral with disk 12.

Disk 12 and socket 36 are fixed to the aircraft's outer skin panels 44 (or to skin panels on the hatch itself) by means of a structural frame 18, coupled to the skin panel by rivets, bolts or other connection means 46. Bearing 16 may be of polished metal, teflon or other material allowing rotation of disk 12 in its cutout with a close tolerance gap 50 cut at an angle to surface 44.

Gap 50 has been maintained at tolerances of 3 thousandths of an inch and an angle of 45 degrees to skin 44 in a preferred embodiment hereof. Closely machined gaps 50 provide an advantage greater than smooth flow of the airstream thereover. Minimizing the extent of gaps 50, 60, also minimizes reflection of impingent electromagnetic energy (search radar) and contributes to lower radar observables of the aircraft. By keeping the gap less than the half wave length of impingent electromagnetic radiation (e.g. search radar) the cover and disk gaps will not reflect the radiation and so not contribute to "radar observables" of the aircraft. Gaps of 3 thousandths of an inch or less provide this advantage. Bearing 16 could be made of the same material as skin 44, but a preferred embodiment uses a thin layer of teflon to ease stresses during disk rotation.

To actuate the mechanism, an allen-wrench type tool 40 with work faces 48 is placed directly over cover 52 and forced downward, perpendicular to skin panel 44. Tool 40 and its work faces 48 should be fabricated from material "softer" than that from which cover 52 is made. Frequent or careless application of tool 40 onto cover 52 could result in scars or scuffs of cover 52 and corrective measures for polishing and smoothing would be required. A non-abrasive tool pad 66 would help prevent damage to cover 52. Spring means 32 resists motion of tool 40 and its zero deflection position is determined by a set screw 34, accessible for biasing adjustment at an access port 56 of end cap 30. End cap 30 secures the disk 12 and socket 36 combination to frame 18 by means of end cap 30. End cap 30 is coupled to the combination by threads or other coupling means with a friction washer 28 between them to resist undesired rotation in flight.

Figure 2:
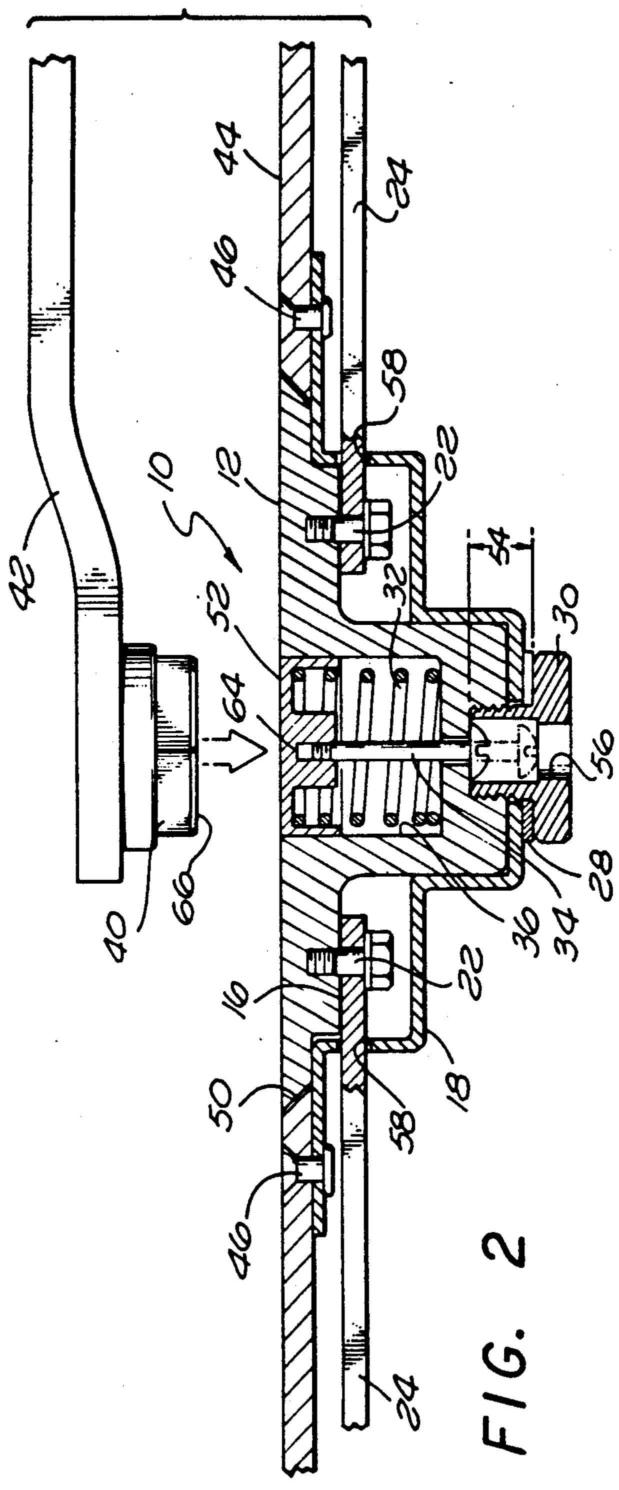
FIG. 2 is a sectional view along A—A, with the socket cover coplanar with its disk.
Figure 3:
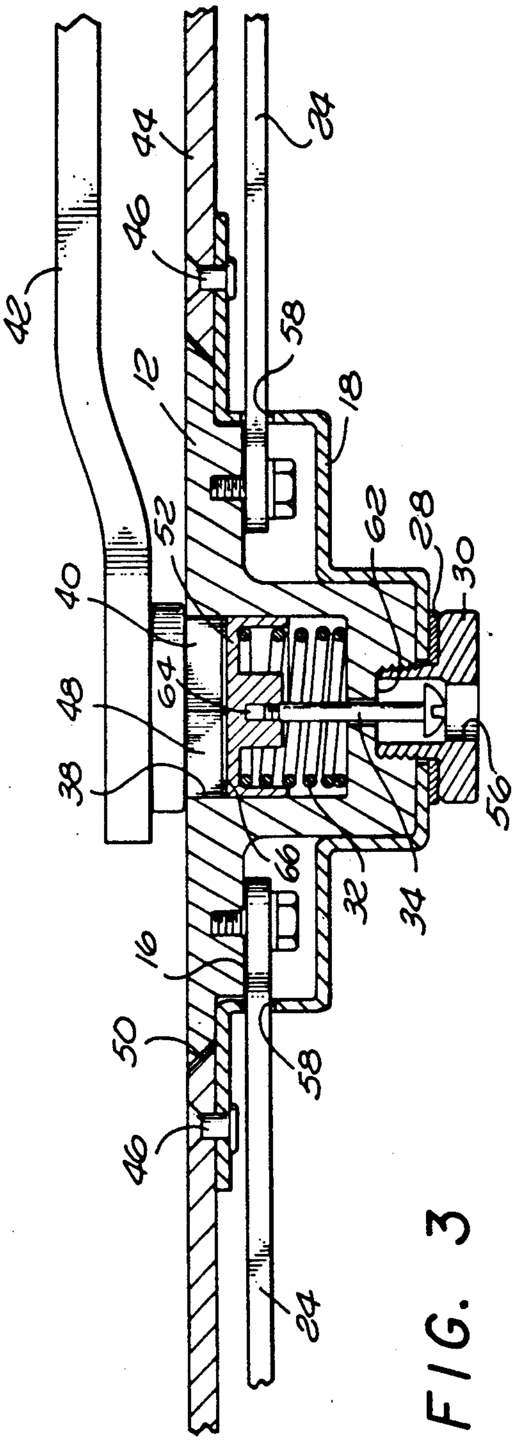
FIG. 3 is a sectional view along A—A, with a tool depressing the socket cover.

FIG. 1 presents tool 40 with working surfaces 40 (FIGS. 2, 3) in a hexagonal configuration for a corresponding hexagonally shaped socket 36. Conventional ratchet wrenches with square drive pins for socket attachment could be used where socket 36 and cover 52 are correspondingly square shaped. Tool 40 can have any shaped head, so long as it corresponds with tool faces 38 of socket 36.

Cover 52 is adjusted for coplanarity with surface 44 by screw means 34. Screw means 34 is seated on shoulder 62 on an underside of socket 36. Threaded receptacle 64 in cover 52 accepts screw means 34 and allows for positioning cover 52. Adjustment of screw 34 to position cover 52 is made through an opening 56 in end cap 30. Adjustment of screw 34 will provide a range of motion for cover 52 as shown by descriptor 54 of FIG. 2.

When tool 40 is inserted into socket 36, its working faces 48 mate closely with parallel tool faces 38 of socket 36. When torque is applied to tool handle 42, socket 36 is rotated with disk 12 coupled firmly thereto. Spindles 22 on the underside of disk 12 have actuator rods 24 rotatably coupled between them and latch pins of hatch opener locks (not shown) for hatch opening. As disk 12 rotates, spindles 22 move actuator rods 24 to activate the latch pins involved. Rods 24 pass through frame 18 at slots 58 and proceed directly to latch pins. Disk 12 may have a plurality of spindles mounted to it and variations of the system could have more than 1 rod 24 attached to each spindle 22, should this embodiment be needed for special purposes. One such embodiment might have two spindles 22 on opposite sides of socket 36 and actuator rods 24 extending in opposite directions. Rotary motion of disk 12 would pull both rods 24 to the same extent, activating two latches at one turn of tool 40. The same reaction could be achieved with a plurality, greater than 2, of spindles 22 and rods 24 for the same plurality of latches on a given hatch cover. Proper positioning of spindles 22 on disk 12, i.e. at different radii from its center, provides for variation in the stroke of rods 24 to accommodate different types of latch. Actuator rods 24 pass through frame 18 via slots 58. Slots 58 can be designed to constrain rotation of disk 12 to a given angular displacement.

Gap 60 between disk 12 and socket cover 52 may, like gap 50, be machined to close tolerances and machining to within 3 thousandths of an inch clearance is an easy requirement to meet.

Close tolerances 55 and 52 reduce radar returns as well as air resistance for the craft. Spring 32 must be of such resilience as to resist compression by slip stream forces at design speeds of the aircraft.

I claim:

1. In a structure provided with a latch operated access hatch a hatch opening mechanism comprising;

a circular planar disk of structural material;

a circular cutout in an outer skin section of said structure;

said circular disk mounted in said circular cutout on bearing means;

a frame fixed rigidly to structure around an area of said skin section encompassing said cutout at an underside of said skin section;

said disk rotatably coupled to said frame through end cap means and friction washer means;

shaped socket means integral with said planar disk at an underside thereof with a center line of said socket means coincident with a central axis perpendicular to the plane of said circular disk;

said socket means having tool faces and a cover;

a cut out at a center of said planar disk, said cutout conforming with said cover and said shaped socket means and positioned directly beneath said shaped socket means;

spring means coupling said cover to said socket and biasing said cover to coplanarity with an outer surface of said disk;

shaped tool means with fixed working surfaces and handle means;

said working surfaces being directly engageable with said tool faces to thereby cause direct rotation of said disk about said central axis when said tool means are disposed into said socket means and torqued through forces applied to said handle means;

spindle means coupled fixedly to an underside of said disk; and at least one latch activator rod having at least two ends thereof, with at least one end thereof coupled rotatably to said spindle means and at least one of said at least two ends coupled to at least one hatch opening latch, said at least one hatch opening latch, when actuated by said latch activator rod, allowing said hatch to be opened.

2. The mechanism of claim 1 wherein said circular planar disk and is less than 3 thousandths of an inch in diameter smaller than said circular cutout.

3. The mechanism of claim 1 wherein surface dimensions of said socket cover conform with dimensions of said socket to within 3 thousandths of an inch.

4. The mechanism of claim 1 wherein said bearing means comprises a teflon surface.

5. The mechanism of claim 1 wherein said bearing means comprises a smooth metallic surface.

6. The mechanism of claim 1 wherein a plurality of actuator rods is used to operate a similar plurality of latch mechanisms.

7. The mechanism of claim 1 wherein a plurality of said spindle means is positioned at intervals on the circumference of a common circle centered along an axis central to said disk.

8. The mechanism of claim 1 wherein a plurality of spindles is positioned at other than uniform distances from an axis central to said disk.

9. The mechanism of claim 1 wherein said spring means comprises coil spring means seated at a base of said socket and coupled to said frame by means of an adjustable screw mated to a threaded receptacle of said cover and seated on a bottom shoulder of said socket.

10. The mechanism of claim 1 wherein said working faces of said shaped tool means are comprised of a substance of softer composition than that substance used for said cover.

11. The mechanism of claim 1 wherein said shaped tool means are square shaped.

12. The system of claim 1 wherein said shaped tool means include a non-abrasive tool pad.

13. On an aerospace vehicle having an access hatch, a hatch opening system comprising:

a circular planar disk fitted closely into a circular cutout in an outer skin of said vehicle, said disk seated on bearing means allowing only rotary motion of said disk about a central axis perpendicular to said disk, a frame fixed rigidly to an underside of skin structure of said vehicle;

said disk rotatably coupled to said frame through end cap means and friction washer means, shaped socket means having tool faces, said socket means integral with said disk at a central location and on an underside thereof;

said tool faces coupled fixedly to an underside of said disk so that motion of said tool faces about said central axis results in motion of said disk about said axis;

a socket cover shaped to conform with said shaped socket means;

spring means coupling said cover to said frame through set screw means, said spring means biasing said cover to coplanarity with an upper surface of said disk;

shaped tool means with fixed working surfaces and handle means, said working surfaces being adapted for direct cooperation with said tool faces to cause rotary motion of said tool faces when said tool means are disposed into said socket means and torqued through forces exerted on said handle means;

spindle means coupled fixedly to said underside of said disk; and at least one latch activator rod having at least two ends thereof with at least one end thereof coupled rotatably to said spindle means and at least one of said other ends coupled to at least one hatch opening latch, said at least one hatch opening latch, when actuated by said latch activator rod, causing said hatch to open.

14. The mechanism of claim 13 wherein said circular planar disk and is less than 3 thousandths of an inch in diameter smaller than said circular cutout.

15. The mechanism of claim 13 wherein surface dimensions of said socket cover conform with dimensions of said socket to within 3 thousandths of an inch.

16. The mechanism of claim 13 wherein said bearing means comprises a teflon surface.

17. The mechanism of claim 13 wherein said bearing means comprises a smooth metallic surface.

18. The mechanism of claim 13 wherein a plurality of actuator rods is used to operate a similar plurality of latch mechanisms.

19. The mechanism of claim 13 wherein a plurality of said spindle means is positioned at intervals on the circumference of a common circle centered along an axis central to said disk.

20. The mechanism of claim 13 wherein a plurality of spindles is positioned at other than uniform distances from an axis central to said disk.

21. The mechanism of claim 13 wherein said spring means comprises coil spring means seated at a base of said socket and coupled to said frame by means of an adjustable screw mated to a threaded receptacle of said cover and seated on a bottom shoulder of said socket.

22. The mechanism of claim 13 wherein said working faces of said shaped tool means are comprised of a substance of softer composition than that substance used for said cover.

23. The mechanism of claim 13 wherein said shaped tool means are square shaped.

24. The system of claim 13 wherein said shaped tool means include a non-abrasive tool pad.

* * * * *